United States Patent [19]

Nogles

[11] Patent Number: 5,501,012
[45] Date of Patent: Mar. 26, 1996

[54] TANK LINING METHOD

[75] Inventor: Thomas G. Nogles, Broomall, Pa.

[73] Assignee: Southcorp Water Heaters USA, Inc., Bala Cynwyd, Pa.

[21] Appl. No.: 496,051

[22] Filed: Jun. 28, 1995

Related U.S. Application Data

[63] Continuation of Ser. No. 195,385, Feb. 14, 1994, abandoned.

[51] Int. Cl.$^6$ ............................................. B21D 39/00
[52] U.S. Cl. ................................. 29/890.051; 29/522.1; 29/890.03
[58] Field of Search .................. 29/890.051, 890.03, 29/522.1; 237/66, 19; 220/586, 589, 400, 401, 409

[56] References Cited

U.S. PATENT DOCUMENTS

| | | | |
|---|---|---|---|
| 307,587 | 11/1884 | Phillips | 220/586 |
| 1,824,898 | 9/1931 | Johnson | 220/586 |
| 2,273,505 | 2/1942 | Florian . | |
| 2,333,968 | 11/1943 | Winter | 29/890.051 |
| 2,695,753 | 11/1954 | Kirk, Jr. . | |
| 3,064,344 | 11/1962 | Arne | 220/586 |
| 3,268,989 | 8/1966 | Erwin et al. | 29/890.051 |
| 3,434,660 | 3/1969 | Brumme et al. . | |
| 3,601,128 | 8/1971 | Hakim . | |
| 3,621,882 | 11/1971 | Kuplec . | |
| 3,675,684 | 7/1972 | Mercier et al. . | |
| 3,721,371 | 3/1973 | Dolveck . | |
| 3,722,751 | 3/1973 | Bisciglia . | |
| 3,828,608 | 8/1974 | Yamamoto . | |
| 3,902,624 | 9/1975 | Stephenson . | |
| 3,917,115 | 11/1975 | Travers et al. . | |
| 4,004,706 | 1/1977 | Guldenfels et al. | 220/586 |
| 4,013,221 | 3/1977 | Eder . | |
| 4,206,908 | 6/1980 | Mercier . | |
| 4,211,208 | 7/1980 | Lindner . | |
| 4,263,498 | 4/1981 | Meyers | 237/66 |
| 4,340,379 | 7/1982 | Williamson . | |
| 4,658,434 | 4/1987 | Murray . | |
| 4,793,044 | 12/1988 | Cartry et al. | 29/890.051 |
| 4,934,032 | 6/1990 | Nelson | 29/890.051 |
| 4,981,112 | 1/1991 | Adams et al. . | |
| 5,110,643 | 5/1992 | Akao et al. . | |
| 5,148,939 | 9/1992 | Roser | 220/401 |
| 5,207,250 | 5/1993 | Tsao . | |
| 5,228,585 | 7/1993 | Lutgen et al. | 220/586 |
| 5,253,778 | 10/1993 | Sirosh . | |

*Primary Examiner*—Mark Rosenbaum
*Assistant Examiner*—Marc W. Butler
*Attorney, Agent, or Firm*—Miller & Christenbury

[57] ABSTRACT

Method of making a lined metallic water tank for a water heater, using the steps (a) making a metallic tank pre-form which is open at one end; (b) inserting a collapsible container through the open end into the pre-form; (c) drawing a vacuum on the container to displace the container away from the open end; (d) enclosing the open end to form a completed water tank while continuing to draw vacuum; and (e) applying pressure, within the container to expand the container against the inside surfaces of the completed tank.

9 Claims, 5 Drawing Sheets

TANK LINING METHOD

This application is a file wrapper continuation of application Ser. No. 08/195385 filed on Feb. 14, 1992 now abandoned.

BACKGROUND OF THE INVENTION

This invention relates to a method for producing lined tanks, particularly water heater tanks which require lining as protection against corrosion. In particular, this invention relates to a method for installing flexible liners in metallic water heater tank shells having a welded construction.

1. Field of the Invention

The welding of lined tanks for water heaters has historically created problems due to the heat generated at the weld joint and conducted throughout the weld heat-affected zone. For example, welding of enamel lined water heater tanks sometimes generates heat sufficient to cause the enamel lining to crack. Similarly, welding a water heater tank that is provided with a polymeric coating generates heat causing the lining to melt, soften, or distort, especially at locations adjacent the weld joints. Accordingly, the integrity of conventional coatings and linings is compromised and, in some cases, utility is threatened or destroyed.

Co-pending application Ser. No. 08/195,387 discloses a new lined storage tank having a welded outer shell and a separate flexible liner mounted within the metal shell close to or contacting the shell inner surface. The liner is normally composed of polymeric or other low-melting but corrosion-resisting material and is provided as a vapor and liquid barrier to prevent corrosion of the shell. Accordingly, a method is required for producing a storage tank assembly of the type disclosed in the aforementioned co-pending application without destroying the integrity of the liner.

2. Objects of the Invention

It is an object of this invention to provide a method for producing a lined storage tank having a welded outer shell and a flexible low-melting liner.

It is another object of the invention to provide a method for producing a welded storage tank without damaging a liner positioned within the tank at or near a weld joint area.

It is a further object of the invention to provide a reliable, inexpensive, and efficient method for producing superior lined storage tanks.

It is yet another object of this invention to provide a method for producing novel corrosion-resisting tanks for water heaters.

SUMMARY OF THE INVENTION

This invention provides a method for forming lined storage tanks wherein a welded tank shell is assembled with a liner, which method protects the shell against contact with corrosive materials in the tank. The liner is in the form of a flexible and closable container such as a bag or bladder and is capable of being positioned near or against the inner surface of the shell. Such a bag or bladder would be likely to be damaged or destroyed by heat generated as the welded shell is welded around the liner.

It has now been discovered that great advantage can be enjoyed by preforming only a portion of the metal tank shell, inserting a flexible polymeric container as a liner into the preformed shell portion, applying a pressure differential between the interior and exterior of the liner to suck, pull or collapse the polymeric container away from the location of the intended weld joint, enclosing the container within the shell by performing the final weld to complete the shell, allowing the heat affected zone and weld joint to cool, and then inflating the flexible container within the shell until it assumes its expanded form as a liner substantially conforming to the shape of the inner surface of the shell.

DETAILED DESCRIPTION OF THE INVENTION

Figure 1:
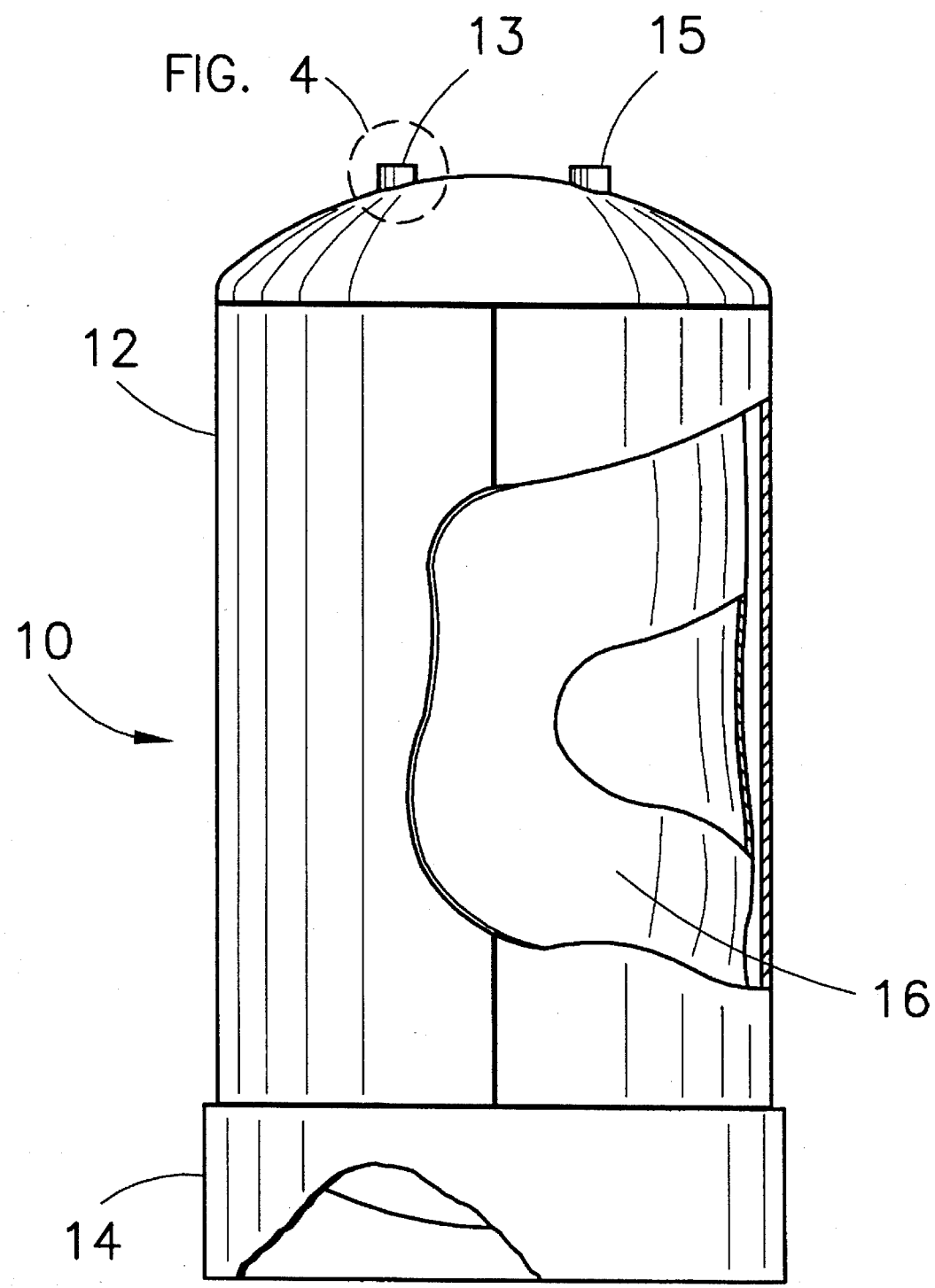
FIG. 1 is a cut-away side view of one form of storage tank capable of being produced according to this invention.

The following description is intended to refer to the specific embodiments of the invention illustrated in the drawings. This description is not intended to define or limit the scope of the invention, which is defined separately in the claims that follow.

Referring to FIG. 1, the numeral 10 designates an embodiment of this storage tank invention used for water storage. Storage tank 10 has an outer shell 12 with ports 13 and 15 for the inlet and outlet of water, respectively. Storage tank 10 has a base 14 upon which outer shell 12 is mounted. Storage tank 10 has a container 16 mounted within outer shell 12 to act as a liner for the containment of water introduced through and removed from ports 13 and 15.

Figure 2:
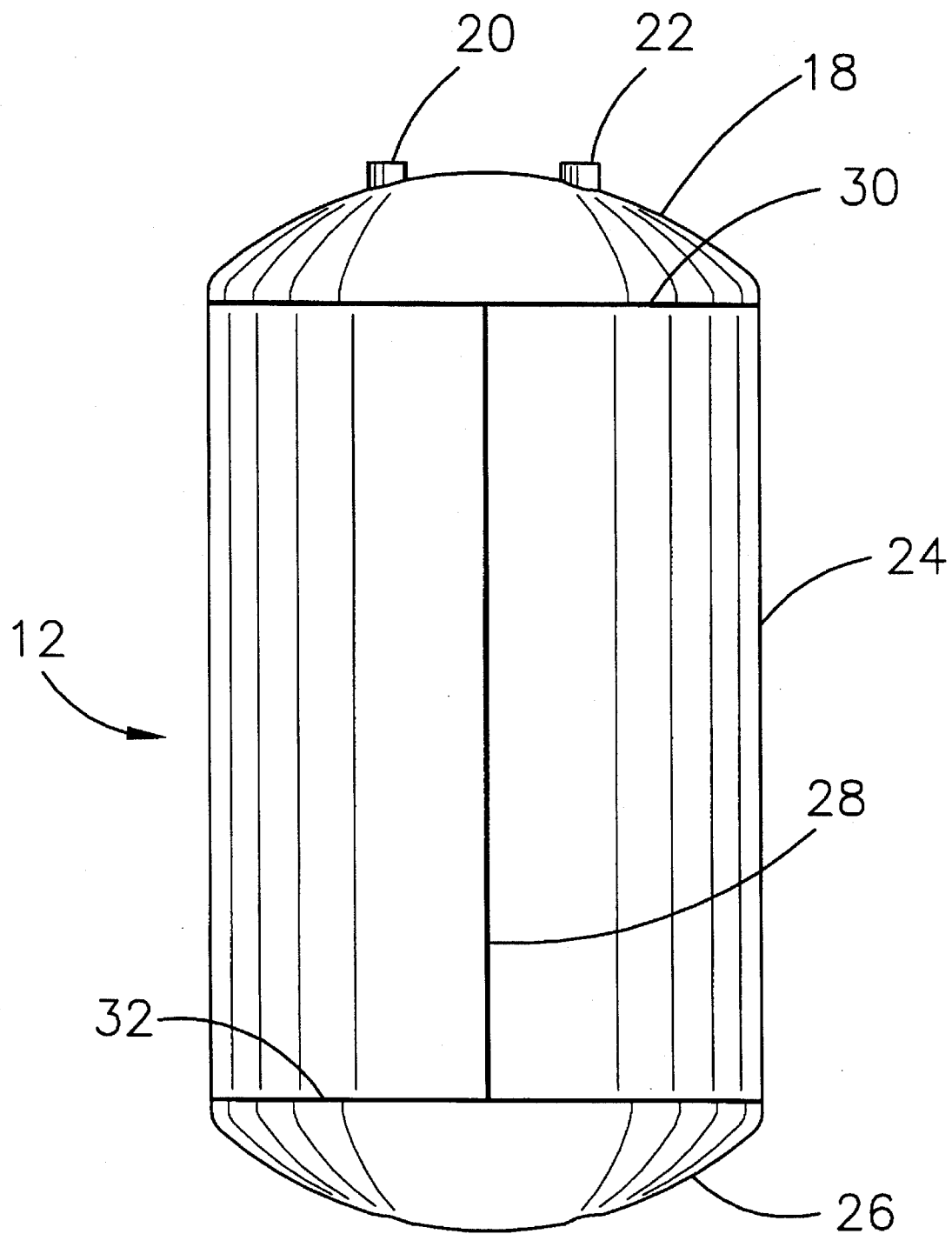
FIG. 2 is a detailed side view of a shell component of a storage tank of the type shown in FIG. 1.

FIG. 2 shows details of outer shell 12. Outer shell 12 has an upper cap 18 on which inlet fitting 20 and outlet fitting 22 are welded. Outer shell 12 has a cylindrical wall 24 as well as a bottom cap 26.

Outer shell 12 has a welded construction wherein fittings 20 and 22 are welded to upper cap 18. Cylindrical wall 24 is provided with a weld seam 28. Upper cap 18 is welded to the top of cylindrical wall 24 along weld seam 30, and bottom cap 26 is welded to the bottom of cylindrical wall 24 at weld seam 32.

Outer shell 12 is formed from thin-wall metallic sheet. Preferably, the sheet has a thickness of about 0.050 inches. Upper cap 18 and bottom cap 26 are pressed disks, and cylindrical wall 24 is formed from sheet curved about a longitudinal axis and welded at weld seam 28.

Weld seams 28, 30 and 32 are preferably formed by a laser welding process to avoid excess heat generation. The metal sheet is preferably not heated beyond its yield point of about 800° F.

Figure 3:
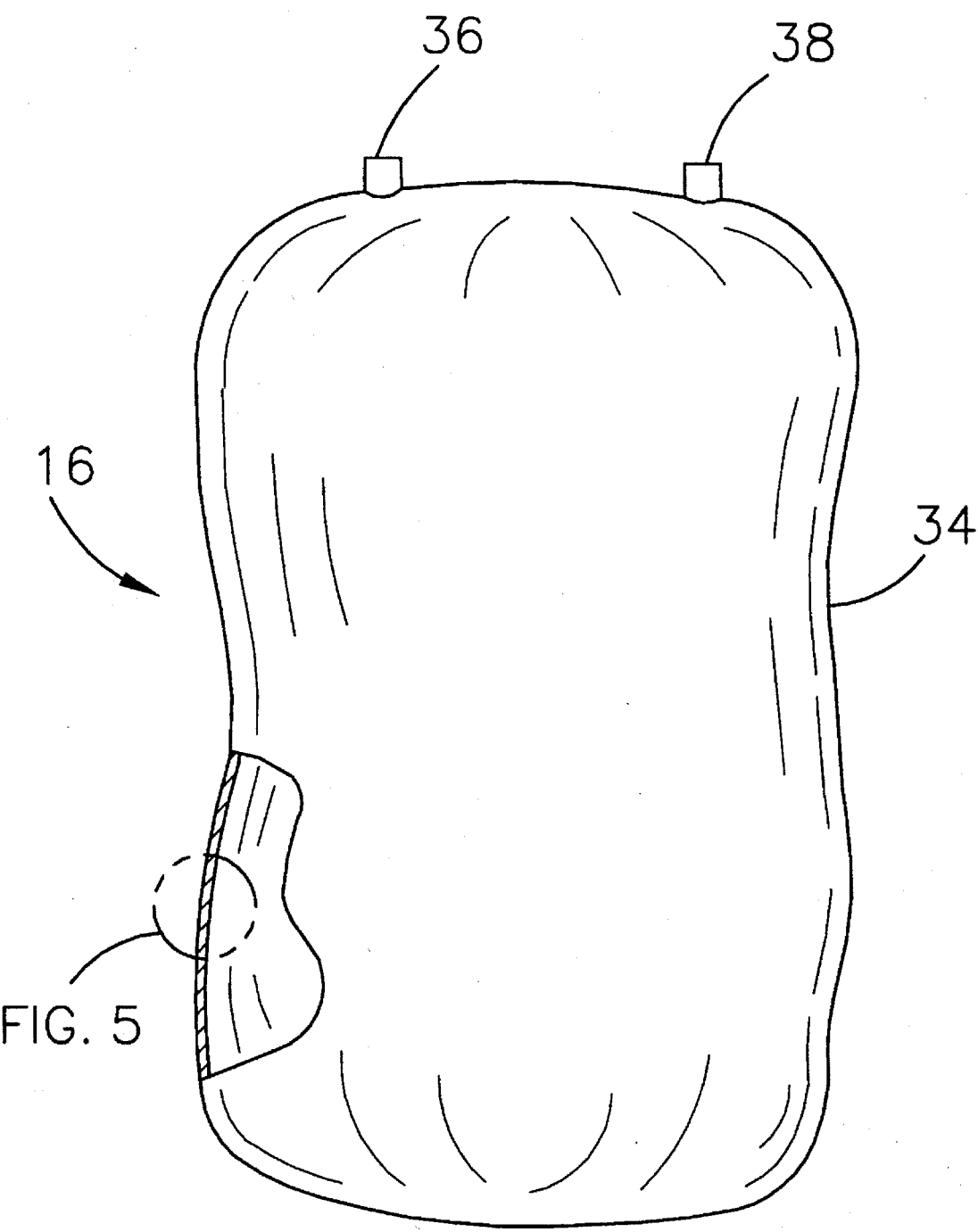
FIG. 3 is a side view of a flexible container adapted to serve as a liner component of the storage tank shown in FIG. 1.

FIG. 3 shows details of an expandable and contractible polymeric container 16, in the form of an enclosed bag having a wall 34 upon which fittings 36 and 38 are attached. Fitting 36 is provided to allow for water inlet into the final tank, and fitting 38 is provided to allow for water outlet from the final tank. Fittings 36 and 38 are attached at holes in wall 34, and are connected to the body of the container via a molding process, a melt process, or a plastics welding process. Wall 34 is quite flexible and is expandable and collapsible in response to vacuum or pressure as between the liner interior and exterior. Wall 34 may be provided with circumferential pleats to permit accordion-like contraction and expansion under the influence of vacuum or pressure.

Container 16 is preferably formed by any of a variety of known extrusion processes or by blow-molding or injection-molding. Wall 34 of container 16 preferably has a multi-layered construction as described later in detail with reference to FIG. 5.

Figure 4:
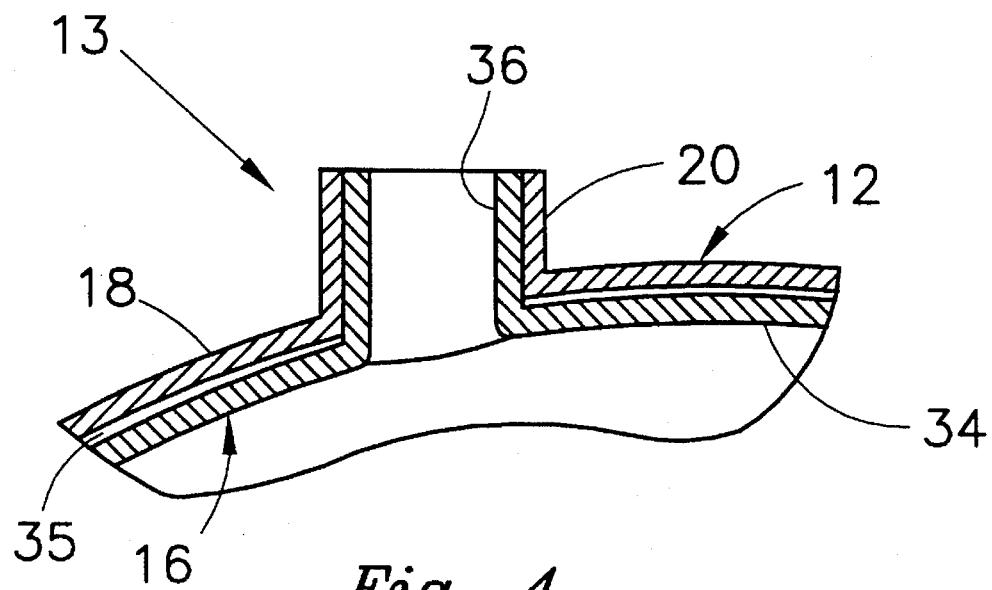
FIG. 4 is a detailed cross-sectional view of an inlet port in the storage tank shown in FIG. 1.

FIG. 4 shows details of water inlet port 13 located in upper cap 18 of the metal water tank. Fitting 36 in wall 34 of container 16 is located within metal fitting 20 in outer metal shell 12 of the water tank (see FIG. 1). Water introduced through inlet port 13 and fittings 20 and 36 and enters the interior of the container 16. The water cannot, however, penetrate into any region 35 that may exist between wall 34 of container 16 and the inner wall of outer metal shell 12.

Figure 5:
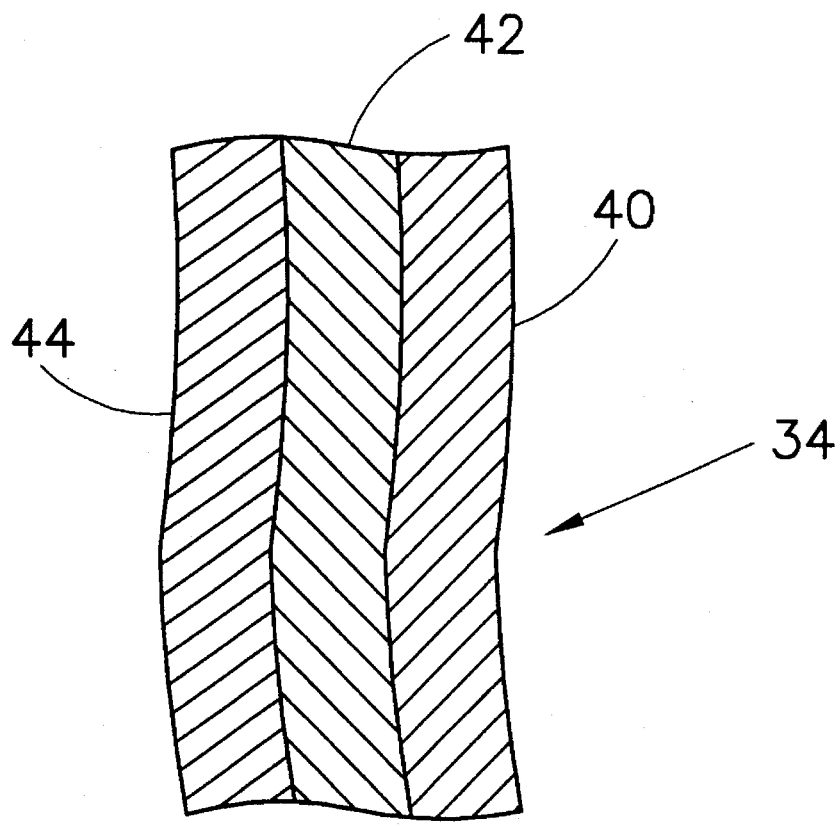
FIG. 5 is a detailed cross-sectional view of the wall construction of a liner made from a container of the type shown in FIG. 3.

FIG. 5 shows details of one preferred embodiment of the cross section of wall 34. Wall 34 preferably has three or more layers, the embodiment shown in FIG. 5 having three such layers 40, 42, and 44. Layer 40, which faces the interior of container 16 (see FIG. 3), is formed of a material appropriate for contact with hot or cold water. The material of layer 40 is optionally capable of providing chemical resistance if the storage tank is provided to contain a material other than water. Layer 40 is preferably formed of polyethylene or polypropylene. Layer 42 provides a vapor barrier to retain vapors within storage tank 10. Layer 42 is preferably a thin layer of aluminum. Layer 44, the outside layer, is preferably an insulating material for providing a barrier between aluminum layer 42 and the interior wall of outer metal shell 12. Layer 44 is preferably polyethylene.

Wall 34 as shown in FIG. 5 is preferably formed by co-extrusion, but other known processes can be used. It is optionally formed from laminated sheet material heat sealed or plastics welded to form a container which becomes a tank liner.

Figure 6:
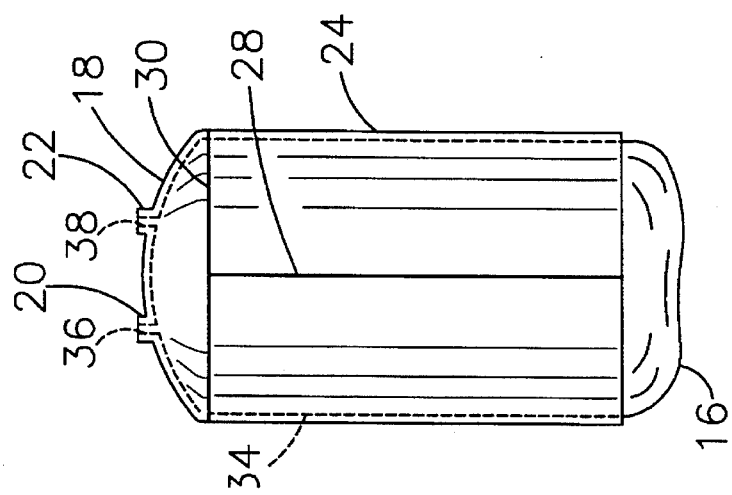
FIG. 6 is a side view of the container of FIG. 3 installed in a pre-assembly of the shell shown in FIG. 2, with the container in an expanded state.

FIG. 6 shows a sub-assembly of outer metal shell 12 (see FIG. 2) with container 16 positioned in the welded sub-assembly of upper cap 18 and cylindrical wall 24. After inlet fittings 20 and outlet fittings 22 are welded to upper cap 18 and cylindrical wall 24 is welded at weld seam 28, upper cap 18 is welded at weld seam 30 to cylindrical wall 24, thereby forming a sub-assembly of outer metal shell 12.

Container 16 is introduced into the pre-assembly of outer metal shell 12 such that fittings 36 and 38 in wall 34 are introduced within inlet fitting 20 and outlet fitting 22 in upper cap 18. Container 16 is shown in its expanded state such that the bottom-most portion of wall 34 extends down below the sub-assembly of outer metal shell 12, which has an open bottom.

Figure 7:
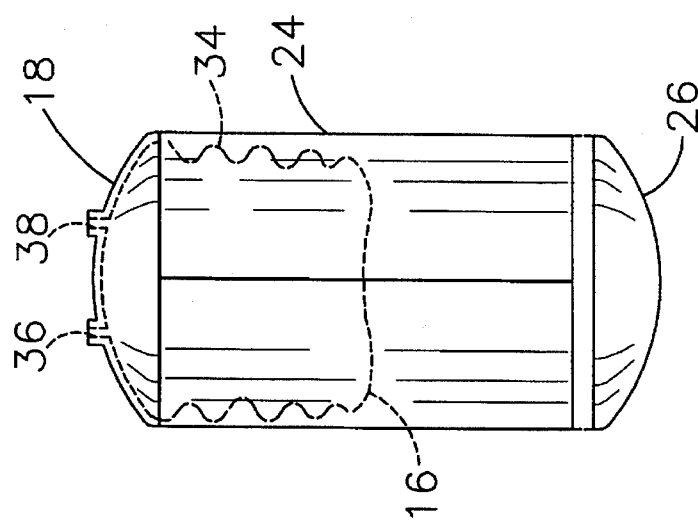
FIG. 7 is a side view of the assembly shown in FIG. 6 with the liner in a contracted state as shown in phantom lines prior to completion of the outer shell shown in FIG. 2.

FIG. 7 illustrates the pre-assembly of outer metal shell 12 just prior to welded attachment of bottom cap 26 to cylindrical wall 24. As illustrated in phantom lines, container 16 is under suction or vacuum and is in a contracted state whereby container 16 is collapsed so that the bottom-most portion of wall 34 is upwardly displaced within the pre-assembly of outer metal shell 12 from the bottom-most portion of cylindrical wall 24. The needed pressure differential is preferably created by applying vacuum to one or both of fittings 36 and 38 in wall 34 of container 16.

Contraction of container 16 displaces the bottom-most portion of wall 34 away from the location of weld joint 32 (shown in FIG. 2) between cylindrical wall 24 and bottom cap 26. This permits welding of weld seam 32, which generates heat at and near the weld joint without destroying, distorting, or harming the container 16.

Figure 8:
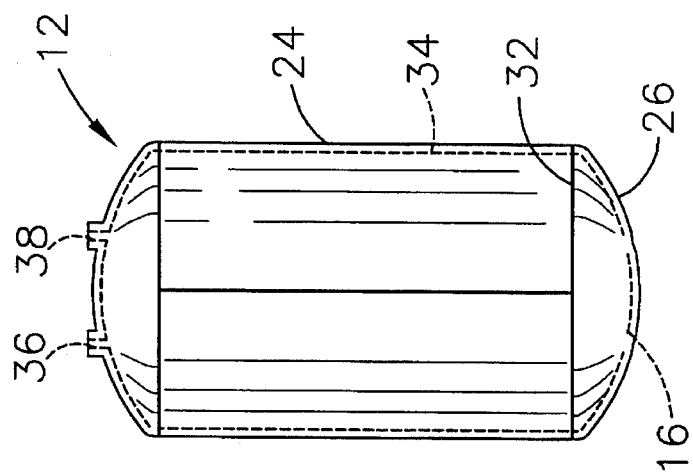
FIG. 8 is a side view of a completed storage tank with the flexible container converted to a liner as shown in phantom lines and in an expanded state.

FIG. 8 illustrates completed welded outer metal shell 12 with container 16 shown in phantom lines in its expanded state as a result of pressurization by compressed air, for example. In this expanded state, wall 34 substantially conforms to the inner surface of outer metal shell 12, extending below cylindrical wall 24 and into and against bottom cap 26. It is expanded after the formation of weld seam 32 and after weld seam 32 has had a chance to cool to a temperature near or below the softening point of the liner's material. This converts the container 16 to a tank wall liner. Internal pressure may then be relieved as desired.

Many changes and modifications can be made without departing from the spirit and scope of this invention. The storage tanks may have a variety of uses, shapes, and configurations. For example, the method of this invention can be used to produce lined water heater storage tanks such as the tanks disclosed in co-pending application Ser. No. 08/195,387.

Such water heater storage tanks have outer shells that are provided with additional ports for pressure valves and thermostats and other desired fittings. Water storage tanks for electric water heaters often have side-mounted ports for one or more heating elements. Tanks for gas-fired water heaters often accommodate a flue for combustion gases. The liners for water heater storage tanks may also be adapted to accommodate additional ports and modifications. It will be appreciated that the method of this invention is ideal for use in the production of water heater storage tanks having a flexible liner mounted within a welded metallic shell.

It will also be appreciated that the method of this invention is ideally used in the production of any lined storage tank having a liner that can be moved relative to an outer shell component. The outer shell need not be a three-piece welded construction and, instead, can have a two-piece, capsule-type welded construction or any other structure. The material of the outer shell is preferably metallic but can also be polymeric having plastics-welded joints or similar construction.

In any embodiment according to this invention, a manufacturing process is provided for the inexpensive and efficient production of lined storage tanks. The method permits the manipulation of a flexible container to form a tank liner in such a way as to protect the liner from thermal or mechanical damage during final assembly of the outer metallic shell of the tank.

Various polymeric and other materials may be used as the container 16. It is important, however, that the container be flexible enough to be removable under pressure differential from the base of the metal tank sub-assembly to allow welding to take place without damaging the container 16 or the liner which it becomes.

If the container includes polymeric or other layers which can later be made rigid or hardened, this may be caused to take place by application of heat or ultraviolet light, for example, after the container 16 has assumed its final expanded position as illustrated in FIG. 8.

Although this invention has been described with reference to specific forms selected for illustration in the drawings, and with reference to many variations thereof, it will be appreciated that many other variations may be made without departing from the important feature of providing an inexpensive and efficient method for forming lined storage tanks. All variations to the embodiments explicitly described herein, including the substitution of equivalent steps for those specifically described, are within the spirit and scope of the invention as defined in the appended claims.

What is claimed is:

1. In a method of making a lined metallic water tank for a water heater, the steps which comprise:

(a) making a metallic tank pre-form having an opening;

(b) inserting a collapsible container through said opening into said metallic tank pre-form;

(c) drawing a vacuum inside said collapsible container to displace said collapsible container away from said opening;

(d) joining a closure to said opening of said metallic tank pre-form to form a completed water tank having inside surfaces while continuing to draw said vacuum; and (e) applying pressure within said collapsible container to expand said collapsible container against said inside surfaces of said completed water tank.

2. The method defined in claim 1 wherein said collapsible container comprises a polymer.

3. The method defined in claim 1 wherein said collapsible container comprises multiple layers of different materials.

4. The method defined in claim 1 wherein said metallic tank pre-form comprises a cylinder with a cap at one end.

5. The method defined in claim 4 wherein said cap includes means providing openings for introduction and withdrawal of water into and from said tank.

6. The method defined in claim 5 wherein said collapsible container includes integral container fittings spaced, sized and shaped to conform to said cap openings.

7. The method defined in claim 1 including the further step of hardening said collapsible container after it has been expanded against said inside surfaces of said completed water tank.

8. A method for manufacturing a lined storage tank including an outer shell comprised of at least two shell body components, at least one of said components having one or more ports connecting an interior region of said outer shell and an exterior region of said outer shell, and a collapsible container positioned within said outer shell including fittings for said ports, said method comprising the steps of:

forming an outer shell pre-assembly of a portion of said outer shell including one or more of said ports, said outer shell pre-assembly having an opening;

inserting said collapsible container through said opening into said outer shell pre-assembly;

attaching said fittings on said collapsible container within said ports in said outer shell;

applying a vacuum to said collapsible container through at least one of said fittings so that a portion of said collapsible container is drawn away from said opening;

attaching one or more remaining shell body components to said outer shell pre-assembly to enclose said collapsible container; and pressurizing said collapsible container through at least one of said fittings to expand said collapsible container against an inner surface of said outer shell to form a liner.

9. The method defined in claim 8 wherein said step of attaching one or more remaining shell body components comprises welding said one or more remaining shell body components to said pre-assembly.

* * * * *